United States Patent
Wiesemann

[11] Patent Number: 6,145,730
[45] Date of Patent: Nov. 14, 2000

[54] METHOD AND SYSTEM FOR CONTROLLING THE PATH OF MOVEMENT OF A WORKPIECE SOCKET HEAD OF AN ORBITAL MOTION WELDING SYSTEM

[75] Inventor: Joachim Wiesemann, Gelsenkirchen, Germany

[73] Assignee: Vectron Elektronik GmbH, Krefeld, Germany

[21] Appl. No.: 09/196,989

[22] Filed: Nov. 20, 1998

[30] Foreign Application Priority Data

Nov. 27, 1997 [DE] Germany .................. 197 52 707

[51] Int. Cl.⁷ .................................................. B23K 20/12
[52] U.S. Cl. .......................... 228/112.1; 228/102; 228/2.1
[58] Field of Search ............................. 228/112.1, 102, 228/113, 114, 29, 2.1, 9

[56] References Cited

U.S. PATENT DOCUMENTS

| | | | |
|---|---|---|---|
| 3,777,967 | 12/1973 | Searle et al. ......................... | 228/2 |
| 4,247,346 | 1/1981 | Maehara et al. ..................... | 156/73.5 |
| 4,905,883 | 3/1990 | Searle ................................... | 228/2 |
| 5,378,951 | 1/1995 | Snyder ................................. | 310/17 |
| 5,833,127 | 11/1998 | Powell et al. ........................ | 228/102 |

FOREIGN PATENT DOCUMENTS

| | | | |
|---|---|---|---|
| 504494 | 9/1992 | European Pat. Off. | ...... B29C 65/06 |
| 1481215 | 7/1977 | United Kingdom . | |
| 1488361 | 10/1977 | United Kingdom . | |

*Primary Examiner*—Patrick Ryan
*Assistant Examiner*—M. Alexandra Elve
*Attorney, Agent, or Firm*—Seyfarth Shaw

[57] ABSTRACT

A method and a system for controlling the path of movement of an orbital motion welding system are provided. The locus path of a voltage space vector of a frequency converter feeding the electromechanical system is adjusted by an oscillation amplitude controller with respect to amplitude by using a path controller working in a rotating coordinate system, and a voltage generator. The adjustment is done with respect to the spectro-composition (relative amplitude and phase of the harmonic oscillations) so that the resulting path of movement equals the desired path of movement. The paths of movement obtainable with the invention include all kinds of ellipses including circular and linear paths of movement along one axis as extremes.

15 Claims, 6 Drawing Sheets

METHOD AND SYSTEM FOR CONTROLLING THE PATH OF MOVEMENT OF A WORKPIECE SOCKET HEAD OF AN ORBITAL MOTION WELDING SYSTEM

BACKGROUND OF THE INVENTION

The present invention relates to a method for controlling the path of movement of a workpiece socket head of an orbital motion welding system as well as to a welding system for performing the method.

Friction welding systems weld workpieces in particular of plastic materials by applying pressure to the workpieces and causing them rapidly to move so as to melt the contact areas of the workpieces without the necessity of adding welding materials. The frequency of such mechanical movement lies in the magnitude of some 100 Hertz. Commonly a system having a movable ferromagnetic mass supported on springs and actuated by several electromagnets is used to generate such movements. Such system is generally driven at a frequency near its mechanical resonance frequency.

Friction welders which perform reciprocating movements along only one axis (so-called linear friction welding systems) are well known in the art. DE 25 39 167 C3 and U.S. Pat. No. 3,920,597 describe such linear welding systems. In such systems it is only necessary to control the amplitude of the displacement along the path of movement. This is accomplished mechanically, and the timing of the movement sometimes referred to as track curve is defined by the mechanical resonance. However, the welding zones show visual bulging of material in the direction of the movements. Furthermore, the movements come to a stand still at the turning points so as to reduce the average velocity.

Therefore, friction welding systems using orbital movements, in first approximation circular movements were developed. EP 0 504 494 A2 and U.S. Pat. No. 5,160,393 which are incorporated herein by reference disclose such systems. Such systems provide for less bulging at the welding area for the bulged material is spread more uniformly at the periphery of the contact area. Furthermore it is possible to obtain the same mean velocity and the same heating power at an amplitude which is 29%($\sqrt{2}$/2) less than with linear welders. The electromagnets in such welding systems are usually driven by commercially available frequency converters which also control the amplitude of the movements as it is known from DE 25 39 167.

However, the path of movement is determined essentially by the mechanical system. Therefore, a circular path is obtained only if not only the tools holding the workpieces but also the workpieces themselves are almost rotationally symmetric with respect to the axis of rotation. Generally, these conditions are not fulfilled. Therefore, workpieces that are not rotationally symmetric will result in an elliptical path of movement will result so that the advantages of orbital movements cannot or only partly be obtained with such workpieces. Therefore, it would be advantageous to have an active control of the path of movement.

SUMMARY AND OBJECTS OF THE INVENTION

It is therefore an object of the invention to provide a method to control the path of movement independently of the path of movement which results from the free movement of the mechanical system. Furthermore, additional to circular paths elliptical paths of movement should be readily obtainable with workpieces which are not rotationally symmetrical.

These objects among others are obtained with the method and system as defined in the appending claims.

The present invention provides for the possibility of obtaining circular movements even with workpieces which are not rotationally symmetrical without requiring a change of the mechanical system. Furthermore, commercially available frequency converters can be used to drive the electromagnets, the microcontrollers of the converters performing an additional control operation.

The mass of the workpiece socket head of the welding system is supported on springs. Such mass combined with springs can be considered being a resonant system. Such resonant system can be forced to perform special movements far from its resonance only by using substantial power. Therefore, elliptical paths of movement including circular and linear movements as extremes which may be obtained at reasonable effort, in particular with respect to the power supply for the workpiece socket head drive should be used. Any of such elliptical paths of movement may be obtained by superimposing two vectors rotating at the same frequency but in opposite directions. Choosing a frequency near the resonant frequency or fundamental frequency allows to generate elliptical paths of movement without too much effort with respect to the power to be provided by the frequency converter.

Furthermore, for special welding applications it is now possible to provide for parametric elliptical movements. These elliptical movements include in particular reciprocating linear movements. Therefore, the welding system and the method of the present invention allow the same welding system to equally handle both orbital and linear movements for welding applications.

The method of the present invention allows to obtain linear oscillations along a freely selectable axis so that an orbital motion friction welder can be used in cases where linear motion is necessary. This is not possible with prior art systems.

The possibility to control the path of oscillatory movements provides for additional advantages in allowing to deviate intentionally from a circular path and to use an elliptical path of movement to produce bulging at locations of the welded product where such bulging is not visible or inacceptable.

Embodiments of the invention which are presently preferred are defined in the dependent claims.

DESCRIPTION OF THE DRAWINGS

Other and further objects and advantages of this invention will become more clearly apparent from the following description when taken in conjunction with the accompanying drawings in which:

Referring to FIG. 1 there is shown the principal mechanical setup of a welding system in a very diagrammatic view. A workpiece socket head W is held by springs F in a rest position and can perform free mechanic oscillations about this rest position at a resonant or fundamental frequency. Mechanical stop limits (not shown) limit the amplitude of such oscillations in every direction. Electromagnets with electromagnetic current windings or coils L are provided for the excitation of the movement. Two sensors S sense the movement of the workpiece socket head W. The mechanical coordinate system which includes an x- and an y-axis is positioned so that the upper one of the coils L applies a force in the direction of the positive x-axis. The direction of rotation of the coils L in the mechanical coordinate system is identical to an electrical coordinate system as shown in FIG. 2.

Referring to FIG. 2 there is shown the arrangement and the circuitry of the coils L of the electromagnets in the electrical coordinate system. The coils can be connected with each other in two different manners, both are shown in FIG. 2. The coils can either be connected in an Y- or star-connection or in a three-phase-connected system. In such case the coils are referenced with La, Lb, and Lc and are positioned in the electrical coordinate system as shown in FIG. 2. Alternatively, the coils can be connected in triangle or delta or mash connection. In this case the coils are referred to as L1, L2, and L3 and are positioned in the electrical coordinate system as shown in FIG. 2. The axes of the coordinate system are labelled as α and β for better distinction from the mechanical coordinate system.

Figure 4:
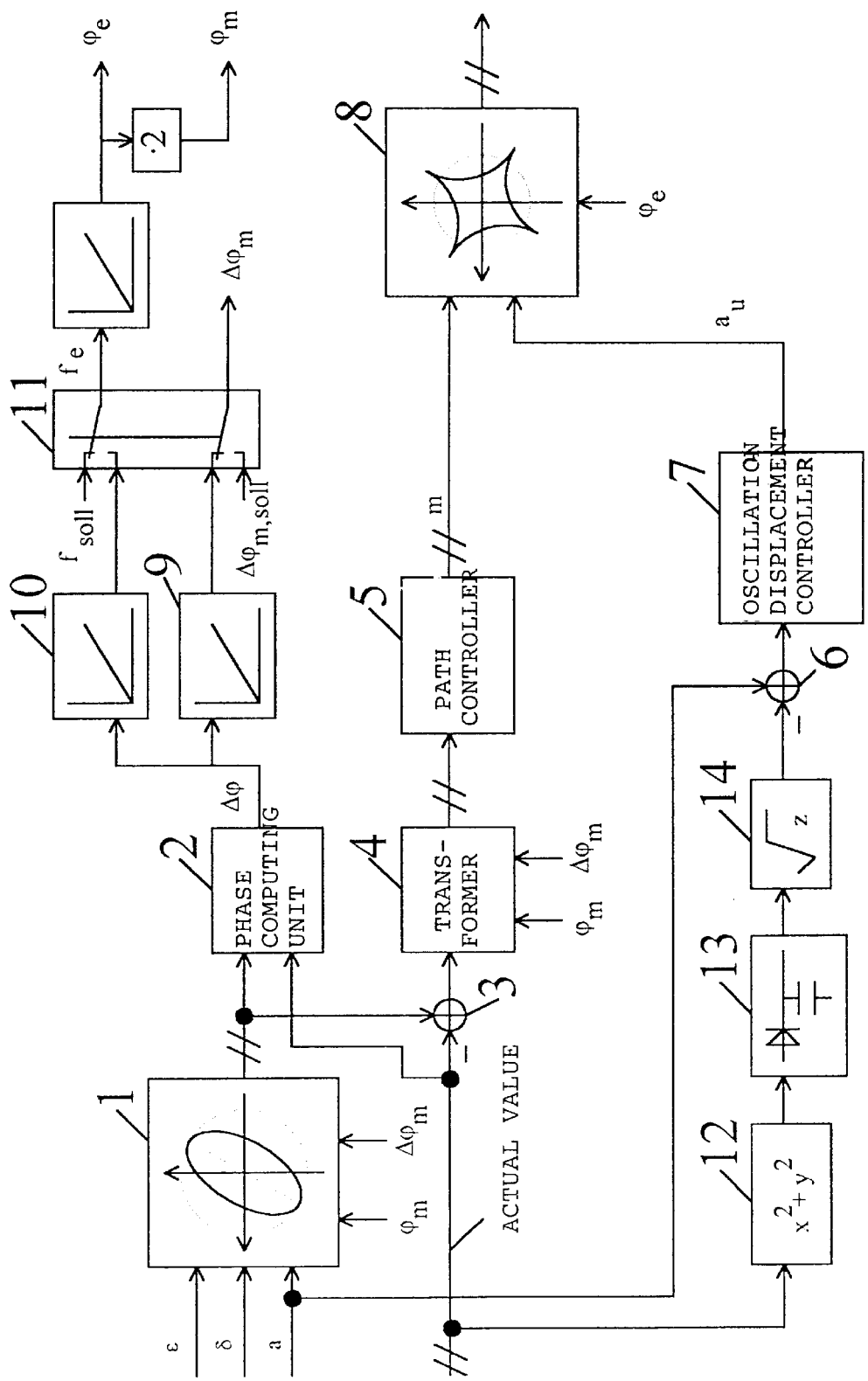
FIG. 4 shows a control unit to control the path of movement.

The coils L are connected to a frequency converter 20 either in triangle connection or star connection. The diodes or valves 21 of the frequency converter 20 are connected to a rectifier 22 which in turn is connected to a power supply. The valves are controlled by using a pulse width modulation unit 23 providing pulse width modulated signals to change the duty cycle of the valves 21 within a given switch period (frequency). The controlling of such pulse width modulation is known in the art and will therefore not be described in detail. Furthermore, such pulse width modulation is only one example of a control principle which could be used within the scope of the present invention. A microprocessor 24 is connected to the output of a voltage generator 8 to control the pulse width modulation unit 23. The voltage generator 8 is shown in FIG. 4. If the computational capability of the microprocessor 24 is sufficient, the microprocessor 24 can perform the computations necessary for the control system as will be described later on. Otherwise a separate processor is necessary.

Generally, the amount of the force applied by an electromagnet on a passive ferromagnetic member (armature) depends on the current flowing through the coil of the electromagnet. The force is always an attractive force and increases with increasing currents independently of the direction of the current. Therefore, the amount of the force generated by using a sinus current oscillates at twice the frequency of the current. Due to this relationship the direction of rotation in the electrical system is opposite to the direction of rotation of the mechanical system. A current space vector rotating in a mathematically positive direction in the electrical system produces a force vector rotating in a mathematically negative direction in the mechanical system at twice the frequency. Therefore, the frequency of the electrical system is generally half of the frequency of the resonance frequency of the mechanical system.

Figure 1:
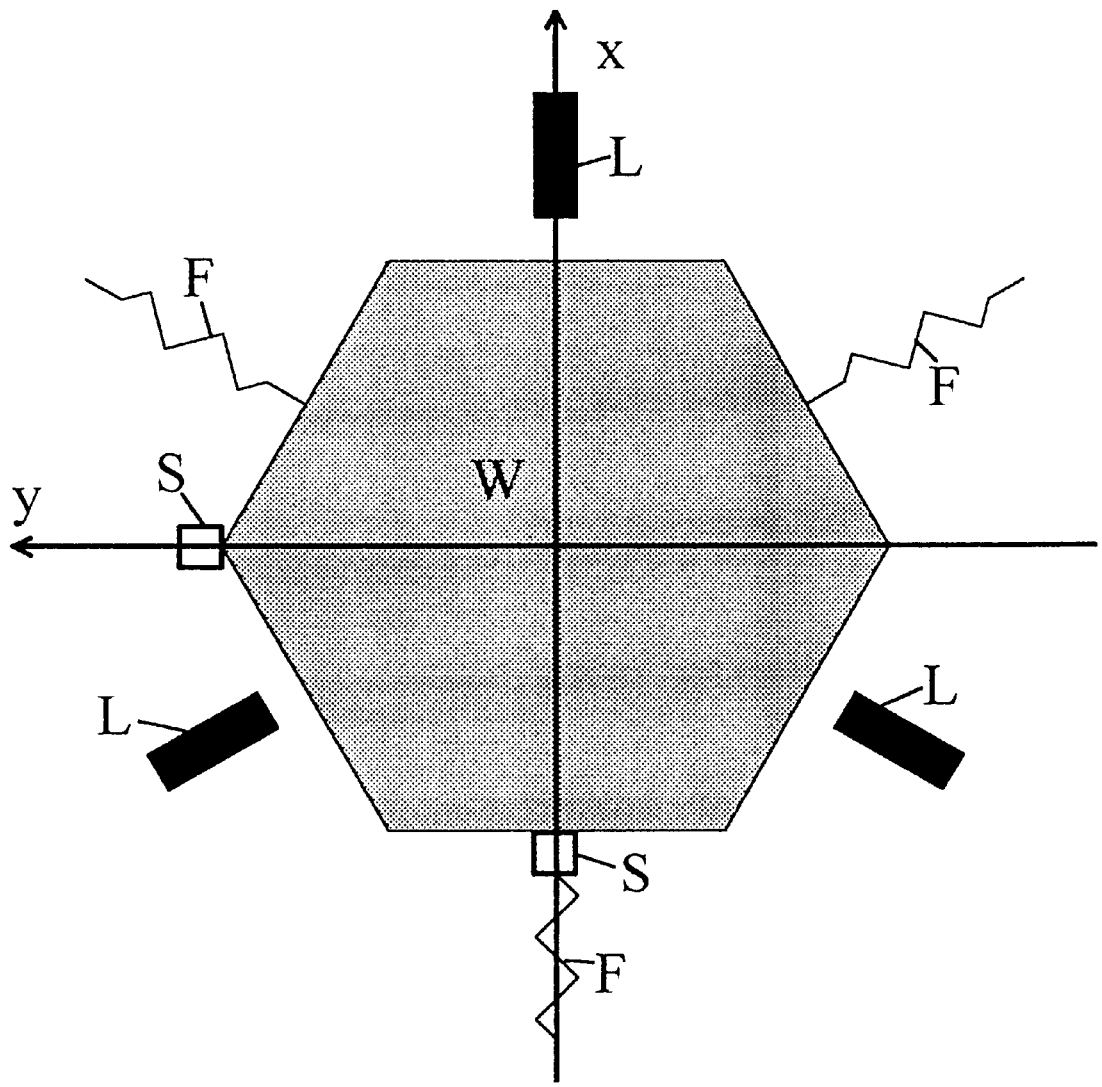
FIG. 1 is a diagrammatic view of the electromechanical system of an orbital friction welder in a mechanical coordinate system.
Figure 2:
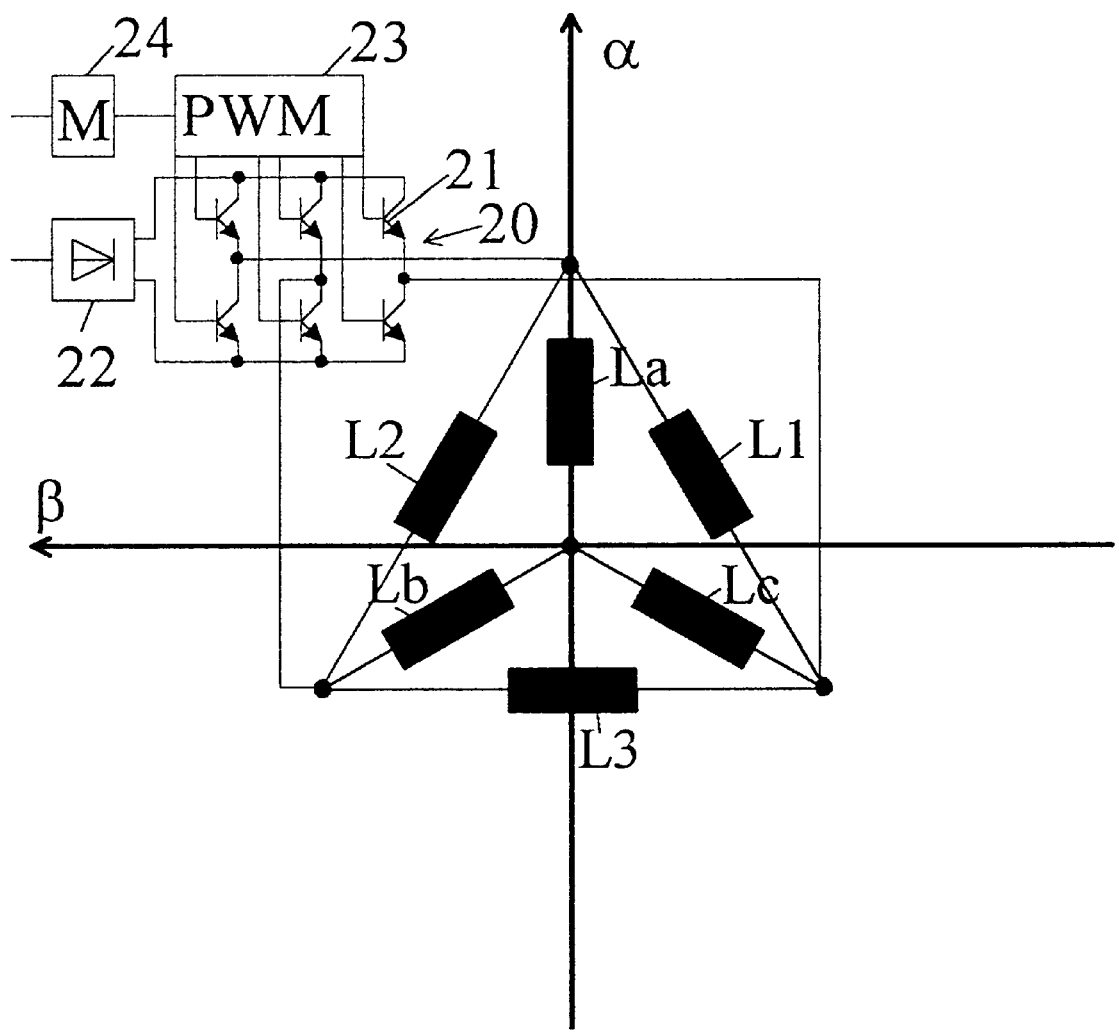
FIG. 2 is a diagrammatic view of the electrical system of an orbital friction welder in an electrical coordinate system.
Figure 3:
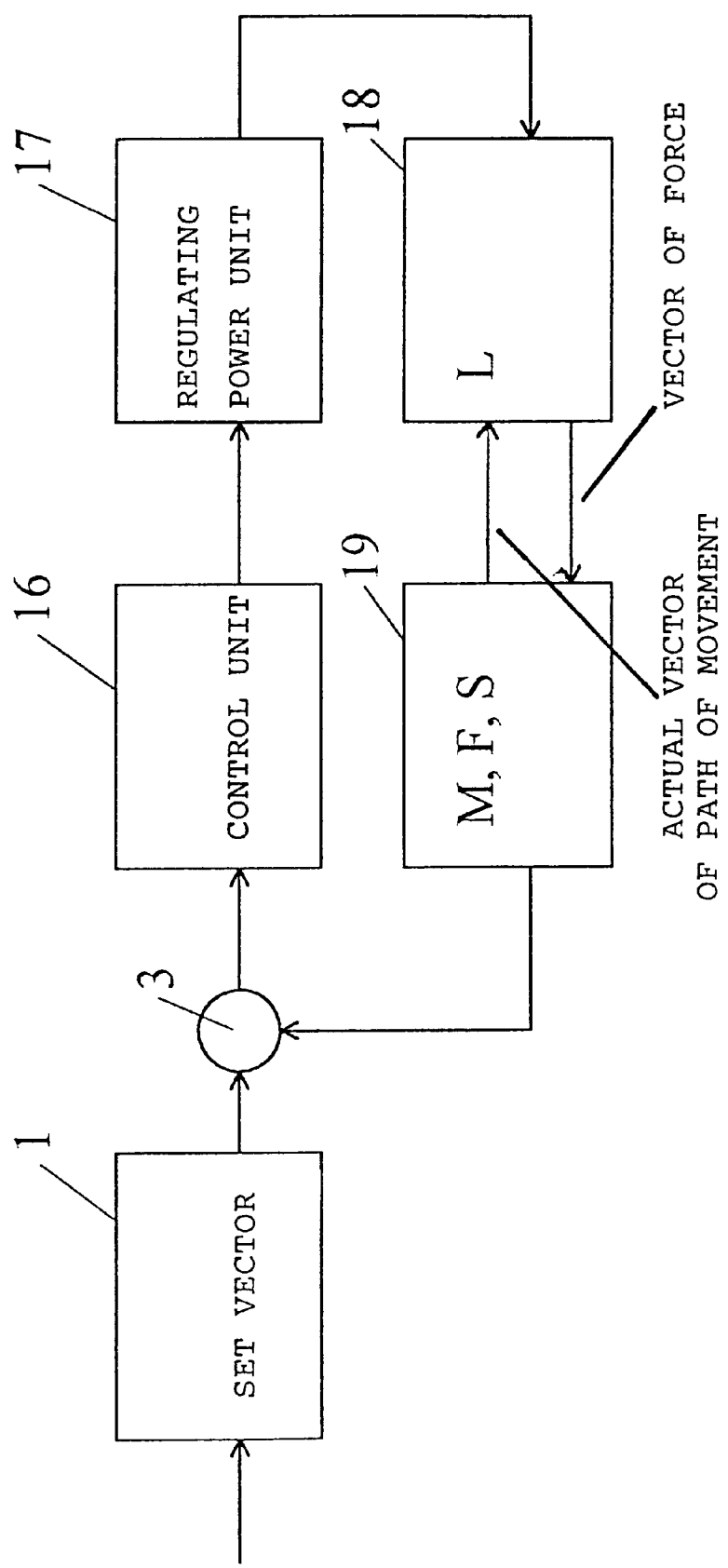
FIG. 3 shows the control loop including control unit, regulating unit, control system of the process, and sample acquisition.

Referring to FIG. 3 there is shown the control loop in a schematic view. The parameters of a desired elliptical movement are given as set values. A set vector generator 1 computes from these set values set coordinates of a set vector of the path of movement. At node 3 these set coordinates are compared with measured actual coordinates to produce a control deviation. This control deviation is fed to a control unit 16 to compute a regulated voltage space vector. This regulated voltage space vector is fed to the regulating power unit 17 comprising the components indicated at 20 to 24 in FIG. 2 to modulate the output voltage for obtaining drift of the coils L as desired.

For a better understanding, the control system can be subdivided into two serially connected modules. The first module 18 symbolizes the electrical system comprising the coils L, which produce an electromagnetic force vector. The second module 19 symbolizes the mechanical system comprising the inertia mass M, the springs F, the mass produced damping and the sensors S. These sensors feed the actual coordinates of an actual vector of the path of movement to the control unit so as to form a closed loop control system. A direct feedback from the mechanical system to the electrical system is produced by air gaps at the coils L changing as a function of the actual vector of the path of movement of the mechanical system.

Referring to FIG. 4 there is shown a controller to control the path of movement of the head W. This controller includes the set vector generator 1 and the controller or control unit 16 shown in FIG. 3. The set vector generator 1 computes the momentary set vector of the path of movement in mechanical coordinates from the following parameters of the ellipse: vertex value a, ellipticity ε and orientation δ of the ellipse. As noted above the set and the actual vectors of the path of movement of the mechanical system oscillate at twice the frequency with respect to the electrical system. Expressed as a complex function the relation is $$\vec{Z}_{soll} = a\left(\frac{1-\varepsilon}{2}e^{-j\varphi_m - \Delta\varphi_m} + \frac{\varepsilon}{2}e^{j\varphi_m - \Delta\varphi_m}\right)e^{j\delta}$$

wherein $\varphi_m = 2\pi f_m t$, wherein $\varphi_m$ represents the angular position of the set vector in mechanical coordinates for a circular path of movement as the product of a circular frequency ω (equal 2π times the frequency $f_m$ of the oscillation) and a time t. The expression $\Delta\varphi_m$ defines a phase which is a deviation of the angular position $\varphi_m$ at time t=0. This phase is a result of the mechanical system being delayed with respect to the electrical system. To perform a synchronization the values $\varphi_m$ and $\Delta\varphi_m$ for the angular position are fed to the set vector generator 1 and to a transformer 4 for transforming them into the electrical coordinate system.

A comparing unit 3 compares the set and actual vectors of movement to obtain a control deviation. The transformer 4 transforms this control deviation into a transformed deviation defined in a rotating coordinate system. This transformed deviation between two ellipses is a constant in the rotating coordinate system having superimposed thereon the difference between the amplitudes as portions alternating at twice the mechanical frequency. The output of the transformer 4 is fed into a path controller 5. This allows the path controller to output an output or regulated value and to control the path deviation without being substantially influenced by the output difference. The output or regulated value of the path controller 5 is a complex modulation factor m to define the waveform of the voltage which is generated by the nominal voltage generator 8. The modulation factor m is fed to the voltage generator 8 and defines the path of movement as a function of the ellipticity ε (elliptic, circular or linear movement) and the orientation of the elliptical or linear oscillation in the mechanical coordinate system (according to the angle δ). This will be explained in more detail with respect to FIGS. 5 and 6.

Furthermore, the vertex value will be determined from the actual vector of the path of movement. Therefore, in block 12 of FIG. 4 an absolute value $x^2+y^2$ is computed from the measured values x and y provided by the sensors S. This absolute value is stored in block 13. The rooting unit 14 computes an actual value for the oscillation displacement. A comparing unit 6 compares this actual value with the set value for the oscillation amplitude a to obtain a control deviation. This control deviation is fed to an oscillation amplitude controller 7. This oscillation amplitude controller 7 provides regulated amplitude $a_u$ for the output voltage. Therefore, it is assured that independent of the actual profile of the path of movement the vertex value of the oscillation amplitude is not greater than the set value to constantly prevent the socket head W from touching the mechanical stop limits (not shown) even in dynamic phases of the path controller 5.

The voltage generator 8 computes the regulated voltage space vector from the regulated amplitude $a_u$ and the modulation factor m. For simplicity, this regulated voltage space vector can be composed by two voltage space vectors rotating in opposite direction. One of these vectors rotates at a frequency $f_e$ of the electrical fundamental oscillation while the other vector rotates in opposite direction at the triple frequency $3f_e$ of the electrical fundamental oscillation. The regulated voltage space vector is defined by the following equation:

$$\vec{u} = a_u(e^{j\phi_e} + me^{-j3\phi_e}) \text{ wherein } \phi_e = 2\pi f_e t.$$

Figure 8:
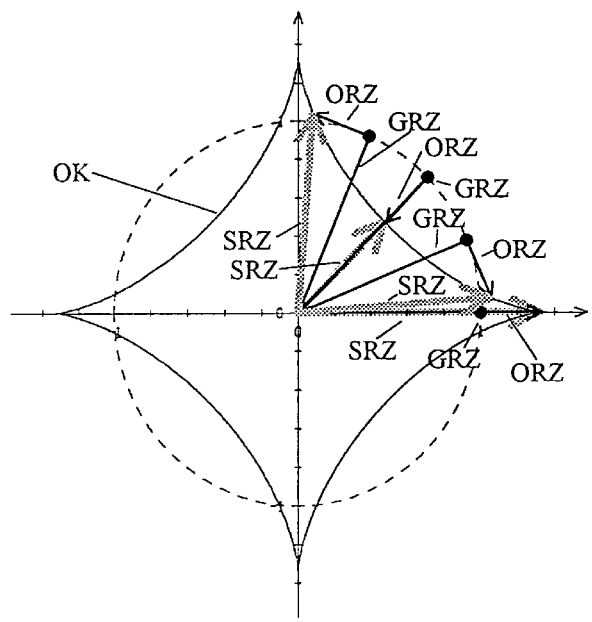
FIG. 8 shows the composition of the voltage space vector by superposition of a fundamental voltage space vector rotating at a fundamental frequency and a harmonic voltage space vector rotating at a harmonic frequency which is three times the fundamental frequency.

As can be seen from FIG. 8 this modulation of the voltage space vector gives a distortion of the locus of the voltage space vector. The voltage space vector GRZ rotates in FIG. 8 along a circular locus at the frequency of the electrical fundamental oscillation. The voltage space vector ORZ rotates at the triple frequency and represents the harmonic oscillations. This results in an overall voltage space vector SRZ obtained by superposition of the vectors GRZ and ORZ. This vector SRZ defines the final locus OK of the voltage space vector.

Figure 5:
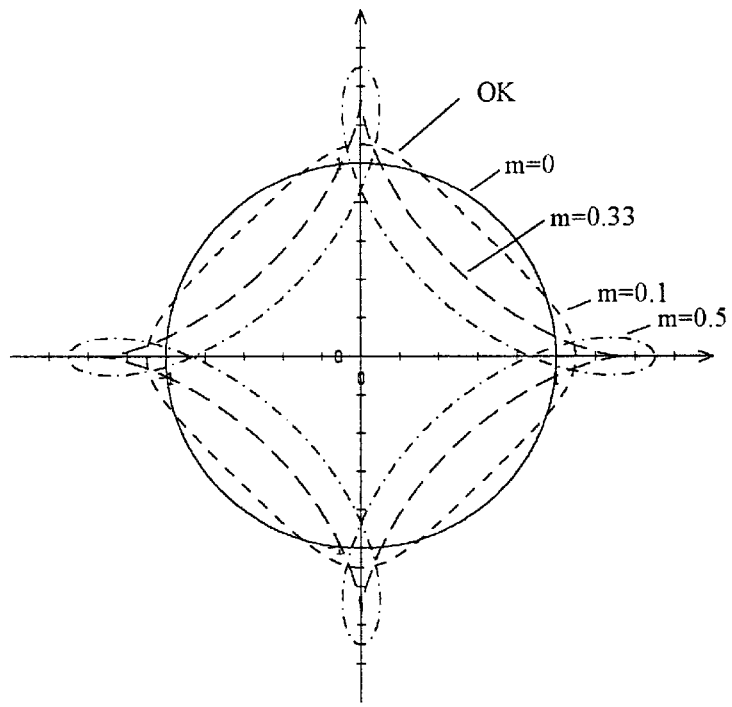
FIG. 5 shows the locus of a voltage space vector for different modulations.

Referring to FIG. 5 there are shown several final loci of the voltage space vectors for different modulation factors m. The modulation factor m for m=0 gives a locus path and generates a circular of movement of the head W. Greater amounts of the modulation factor m give cussion-like distorted loci which result in more elliptical paths of the movement of the head W in the mechanical system. Almost linear oscillations of the head W in the mechanical system can be produced by using a modulation factor having the amount of 0.5. The voltage space vector can also be obtained by superposition of additional voltage space vectors of higher or different harmonic oscillations. This allows for a higher dynamic and for a smaller force ellipse to fulfill extreme control requirements of special applications. However, in most cases the composition of a voltage space vector using the fundamental oscillation and the harmonic oscillation at the triple frequency is sufficient to fulfill the requirements.

Figure 6:
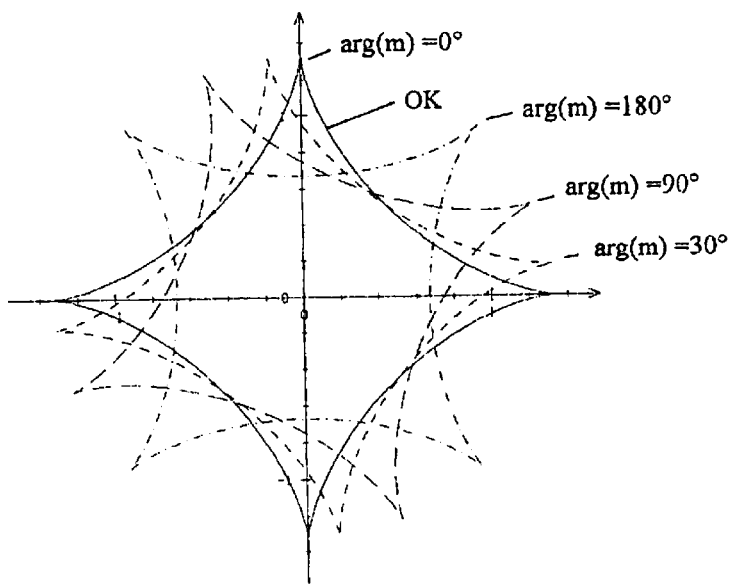
FIG. 6 shows the locus of the voltage space vector for different angle parameters of the modulation factor.

Referring to FIG. 6 there are shown the loci of the voltage space vectors obtained for different angular parameters arg(m) of the modulation factor m with an amount of the modulation factor of 0.33. The set amplitude in FIG. 6 is $a_u=1$ as in FIG. 5.

Figures 7A, 7B:
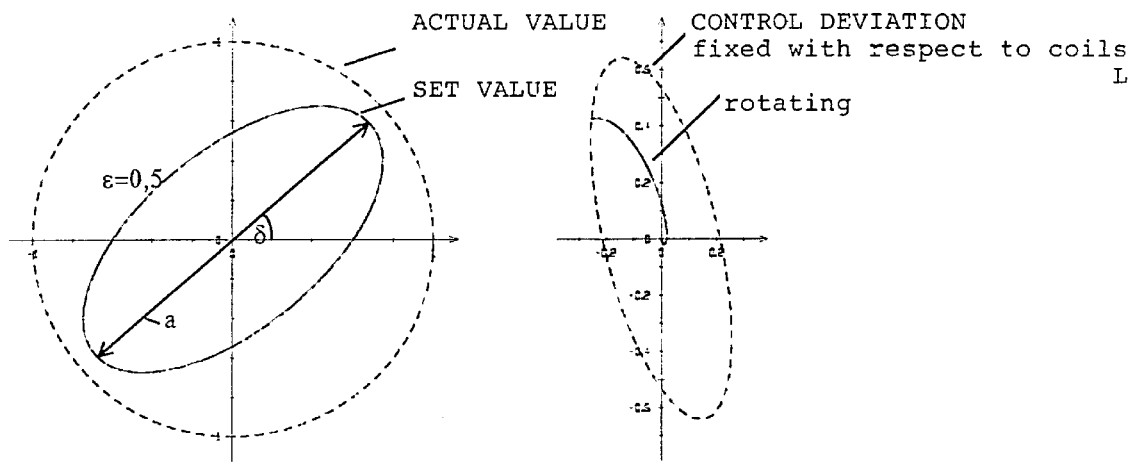
FIG. 7A shows the locus of set and actual vectors.
FIG. 7B shows the locus of a deviation obtained by using the set and actual vectors in fixed and rotating coordinates.

With respect to FIGS. 7a and 7b, the former shows paths of movement of the mechanical system. For instance the mechanical system oscillates along a circular path (actual value) at a vertex value of a=1.0 and an ellipticity of ε=0.0. However, the set vector generator 1 has as set value an elliptical path of movement of a mechanical system with the parameters a=0.9, ε=0.5 and δ=40°. The comparing unit 3 computes from these values the control deviation shown in FIG. 7b. Therefore the output of the comparing unit 3 provides a control deviation which is fixed with respect to the stationary coils L while the coordinate system transformer 4 provides a transformed rotating control deviation which is fed to the path controller 5.

The deviation $\Delta\phi_m$ of the angular position of the set vector of movement is corrected as follows: a phase computing unit 2 shown in FIG. 4 calculates a phase difference $\Delta\phi$ from set and actual vectors of movement. This phase difference $\Delta\phi$ includes a phase shift $\Delta\phi_s$ of the system (not shown). This phase shift $\Delta\phi_s$ has its origin in the mechanical system responding to the electrical system with the time delay noted above. Due to this system-inherent phase shift $\Delta\phi_s$ the control deviation controlled by the path controller 5 is not zero even if the actual path is similar to the set path of movement. A phase controller 9 is provided to eliminate this error. This phase controller 9 sets the phase of the set vector of movement at the set vector generator so that an average of the phase difference $\Delta\phi$ becomes zero. To achieve this, the set vector generator 1 receives a correction value which is the deviation $\Delta\phi_m$ of the angular position computed by the phase controller 9. A mode select switch 11 is provided to feed this value $\Delta\phi_m$. In a preferred embodiment this mode select switch 11 is set to a fixed frequency $f_e=f_{soll}$. In another position of the mode select switch 11 a fixed phase $\Delta\phi_{m,soll}$ of the set vector of movement is fed to the set vector generator 1. A frequency controller 10 is provided to produce the correction value by changing the frequency of the voltage space vector so that the frequency depending phase shift of the control system changes an average value of the phase error so as to become zero. In this preferred embodiment $\Delta\phi_m$ is set to be fixed and the angular position $\Delta\phi_m$ of the set vector of movement is corrected and used as correction value which is fed to the set value generator 1. This tuning can be obtained during the control process, and is called online tuning. Using this online tuning the electrical power necessary for a desired path of movement can be minimized for a given optimal phase shift of the control system, thereby to provide for maximum efficiency.

From the foregoing description it will be apparent that there has been provided an improved friction welding system and an improved method of controlling such system. Variations and modifications of the herein described system and method may be provided without deviating from the broad principle of the spirit of the present invention, which shall be limited only by the scope of following claims.

I claim:

1. In a method for controlling a path of movement of a workpiece socket head of an orbital vibratory welding system for friction welding of workpieces including said head receiving a workpiece, resilient means to which the head is mounted, electromechanic actuating means for driving said head so as to be subjected to orbital vibrations in an orbital plane, and a frequency converter for driving said electromechanic actuating means by feeding an oscillating voltage to said electromagnetic actuating means, said oscillating voltage having a voltage space vector which moves along a locus in a voltage space, said oscillating voltage being controlled such that said locus of said voltage space vector causes said head to move along an elliptical path.

2. The method of claim 1, wherein said elliptical path of movement of said head includes both extremes of an ellipse: a circular path of movement and a linear path of reciprocating movement along an axis.

3. The method of claim 1, wherein said path of movement of said head is measured by using at least two sensors lying not on the same axis with respect to the head to obtain an actual vector of movement of said head and said path of movement of said head is controlled by using said actual vector, wherein said sensors measure at least two of the following three parameters: acceleration, velocity, and position of said head.

4. The method of claim 1, wherein said voltage space vector is obtained by superposition of a fundamental voltage space vector performing a fundamental oscillation by rotation in said voltage space at a fundamental frequency which is approximately half of the mechanical resonance frequency, and at least one harmonic voltage space vector performing a harmonic oscillation by rotation in said voltage space at a harmonic frequency with adjustable amplitude and phase.

5. The method of claim 1, wherein a vertex value of said locus of said voltage space vector is controlled by an oscillation amplitude controller which is independent of the control of said path of movement of said head, wherein said path of movement is measured to obtain the amount of a vertex value of said path of movement, which oscillation amplitude controller uses said amount of said vertex value of said path of movement as an actual value and an amount of vertex value of a set path of movement of said head as set value.

6. The method claim 4, wherein said amplitude and said phase of said harmonic oscillation are calculated as a function of a complex modulation factor m defined by an amount parameter and an angle parameter to obtain an elliptical path of a vector of force applied between said workpieces such, that a ratio between the longer axis of said elliptical path of said vector of force and the shorter axis of said elliptical path of said vector of force increases with increasing amount parameters of said modulation factor m and that the orientation of said elliptical path of said vector of force (with respect to the angular coordinate of the vertex of said elliptical path of said vector of force in mechanical coordinates) is a linear function of said angle parameter of said modulation factor m.

7. The method of claim 1, wherein set vector generating means of adjustable phase generate a set vector of movement along a parametric path which may be of any elliptical shape.

8. The method of claim 7, wherein said set vector of movement is compared with a measured actual vector of movement to obtain a differential vector and wherein said differential vector is transformed into rotating coordinates having adjustable phase.

9. The method of claim 8, wherein a twodimensional controller operates using said rotating coordinates and a complex modulation factor m defining harmonic oscillations being superimposed to said voltage space vector performing a fundamental oscillation as a regulated quantity.

10. The method of claim 7, wherein a phase of said set vector generating means is adjusted so that the average value of a phase error between the set and the actual vectors of movement will be zero.

11. The method of claim 7, wherein the phase of said set vector is preset and the frequency of rotation of said voltage space vector in said voltage space is adjusted so that the average value of a phase error between the set and the actual vectors of movement will be zero.

12. In an orbital vibrating welding system including a welding head receiving a workpiece, resilient means to which the head is mounted and electromechanic actuating means including current windings for driving said head into orbital vibrations, set vector generating means (1) for generating a set vector of movement according to a desired path of movement of said head, phase calculating means (2) receiving said set vector for calculating a phase, measuring means for measuring an actual vector of movement, comparing means (3) for comparing said actual and set vectors of movement by subtraction of said measured actual vector from said set vector to determine the deviation of said actual path of movement from said desired path of movement, transforming means (4) to transform said deviation into a transformed deviation in rotating coordinates used by a twodimensional path controlling means (5) to compute a complex modulation factor m from said transformed deviation and to control said deviation to become zero, comparing means (6) to compare a maximum vertex value of said set vector with a maximum vertex value of said actual vector and to generate a comparing means output value, oscillation amplitude controlling means (7) receiving said comparing means output value to define a regulated amplitude such that said comparing means output value becomes zero, voltage generating means (8) to generate a regulated voltage space vector from said regulated amplitude of said voltage and said modulation factor m, a power supply (17) for said electromechanic actuating means to supply said current windings of said eletromechanic actuating means with the electrical power necessary to drive said head and frequency converting means providing an output voltage to said current windings of said electromechanic actuating means and having its input coupled to said power supply wherein said output voltage of said frequency converting means is controlled by said power supply so that said output voltage equals said regulated voltage space vector as desired.

13. The system of claim 12 further comprising phase controlling means (9) to control a phase of said set voltage generating means such that an average of said phase calculated by said phase calculating means (2) becomes zero.

14. The system of claim 12, further comprising frequency controlling means 10 to control a frequency of said voltage space vector such that an average of said phase error calculated by said phase calculating means (2) becomes zero.

15. The system of claim 12, further comprising phase controlling means (9) to control a phase of said set voltage generating means such that an average of said phase calculated by said phase calculating means (2) becomes zero and further comprising frequency controlling means 10 to control a frequency of said voltage space vector such that an average of said phase calculated by said phase calculating means (2) becomes zero, and mode select switching means 11 to selectively activate any of said phase controlling means (9) and frequency controlling means (10) and inactivate the respective other one thereof.

* * * * *